United States Patent
Daoud et al.

(10) Patent No.: US 10,900,599 B2
(45) Date of Patent: Jan. 26, 2021

(54) QUICK CONNECTOR COUPLING

(71) Applicant: KA Group AG, Zürich (CH)

(72) Inventors: Karlus Daoud, Enschede (NL); Laurentius Andreas Gerardus Mentink, Haaksbergen (NL)

(73) Assignee: KA Group AG, Zürich (CH)

( * ) Notice: Subject to any disclaimer, the term of this patent is extended or adjusted under 35 U.S.C. 154(b) by 349 days.

(21) Appl. No.: 15/898,319

(22) Filed: Feb. 16, 2018

(65) Prior Publication Data
US 2018/0238479 A1   Aug. 23, 2018

(30) Foreign Application Priority Data

Feb. 17, 2017   (EP) ..................................... 17156699

(51) Int. Cl.
| | | |
|---|---|---|
| *F16L 37/14* | (2006.01) | |
| *F16L 33/30* | (2006.01) | |
| *F16L 37/088* | (2006.01) | |
| *B29C 45/44* | (2006.01) | |
| *B29C 45/33* | (2006.01) | |
| *B29L 31/24* | (2006.01) | |

(52) U.S. Cl.
CPC ............ *F16L 37/144* (2013.01); *B29C 45/33* (2013.01); *B29C 45/44* (2013.01); *F16L 33/30* (2013.01); *F16L 37/0885* (2019.08); *B29L 2031/24* (2013.01)

(58) Field of Classification Search
CPC ............................. F16L 37/144; F16L 37/0885
USPC .................................................. 285/305, 321
See application file for complete search history.

(56) References Cited

U.S. PATENT DOCUMENTS

| | | |
|---|---|---|
| 5,586,792 A | 12/1996 | Kalahasthy et al. |
| 2002/0182005 A1* | 12/2002 | Milhas ................ F16L 37/0885 403/403 |

FOREIGN PATENT DOCUMENTS

| | | |
|---|---|---|
| DE | 102014102662 A1 | 9/2015 |
| EP | 1143187 A2 | 10/2001 |

OTHER PUBLICATIONS

Computer-generated English language abstract for DE102014102662A1 extracted from espacenetcom database on Mar. 1, 2018, 2 pages.

(Continued)

*Primary Examiner* — David Bochna
(74) *Attorney, Agent, or Firm* — Howard & Howard Attorneys PLLC

(57) ABSTRACT

A quick connector coupling comprises a collar port having a passage and a collar, a connector to be coupled to the collar port and comprising a tube portion to be received in the passage, a flange on the tube portion, a sealing ring received in a groove on the tube portion, and a locking clip for engaging the collar and an engagement surface of the connector to lock the connector against axial movement. With the connector in a mounted state, the flange has extensions extending along the tube portion beyond the collar, the extensions carry a terminal ring with a surface facing the flange forming the engagement surface spaced from the collar, the clip arranged to lock the connector on the collar port against axial movement, and the groove is axially formed on the tube portion such that the groove is closer to the flange than the engagement surface.

11 Claims, 8 Drawing Sheets

(56) References Cited

OTHER PUBLICATIONS

English language abstract for EP1143187A2 extracted from espacenet.com database on Mar. 1, 2018, 1 page.
European Search Report for Application EP17156699 dated Aug. 3, 2017, 2 pages.

* cited by examiner

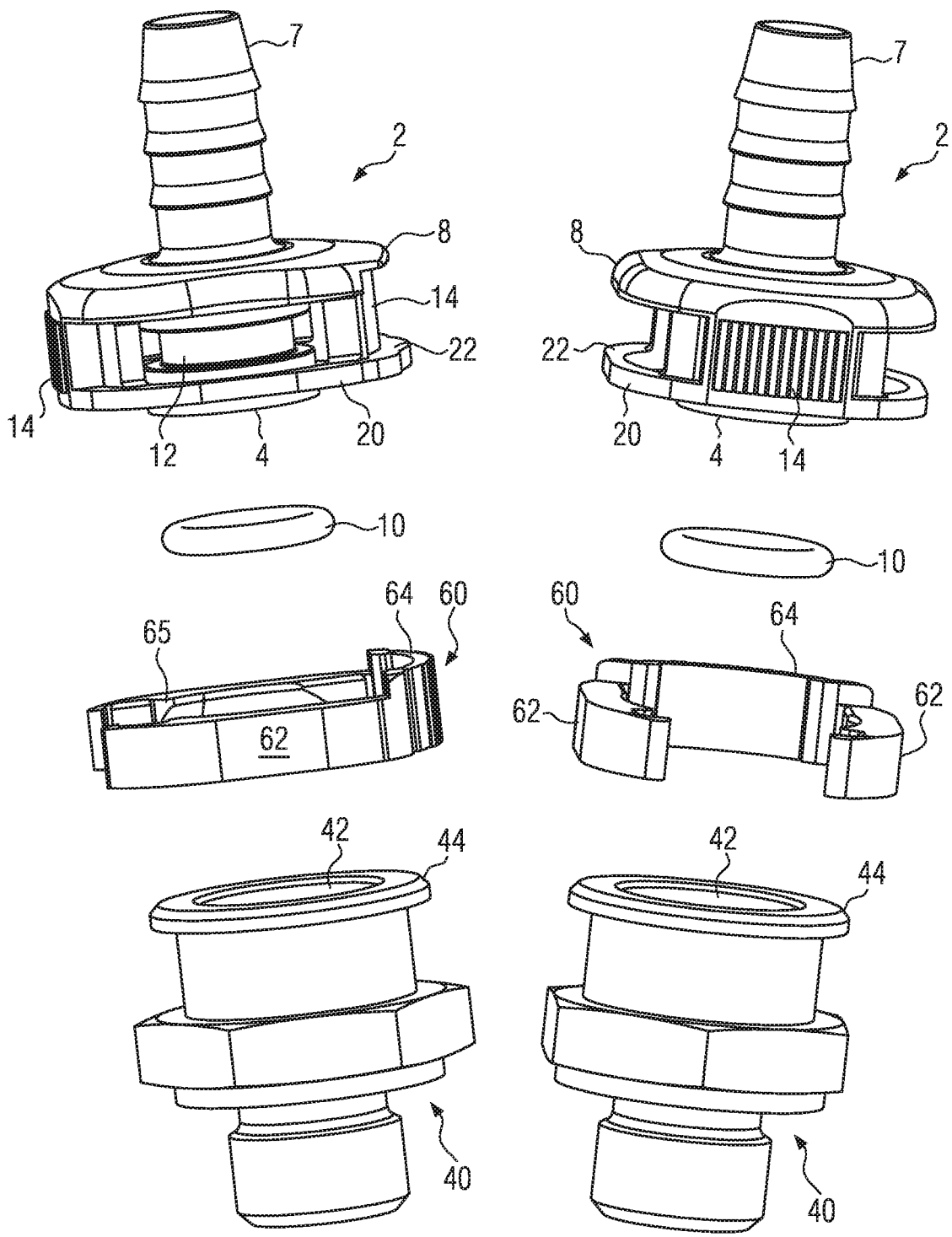

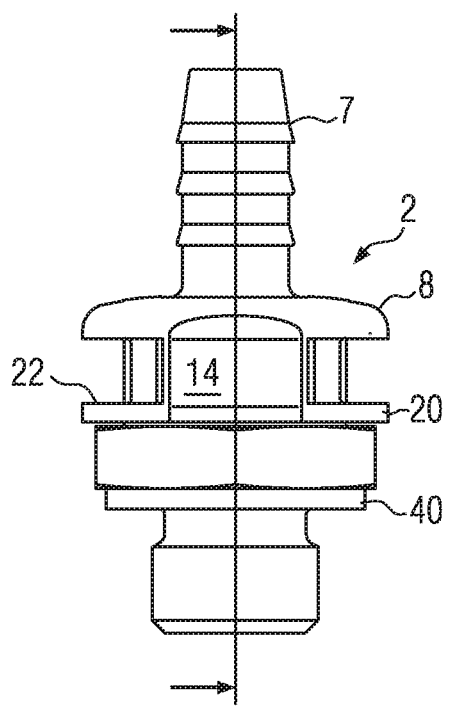
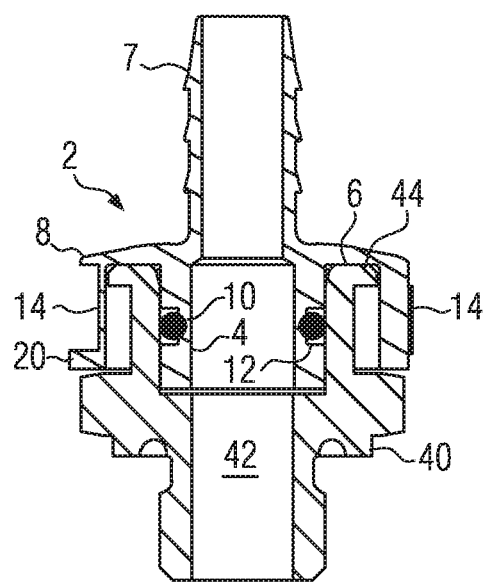
FIG. 5  FIG. 6
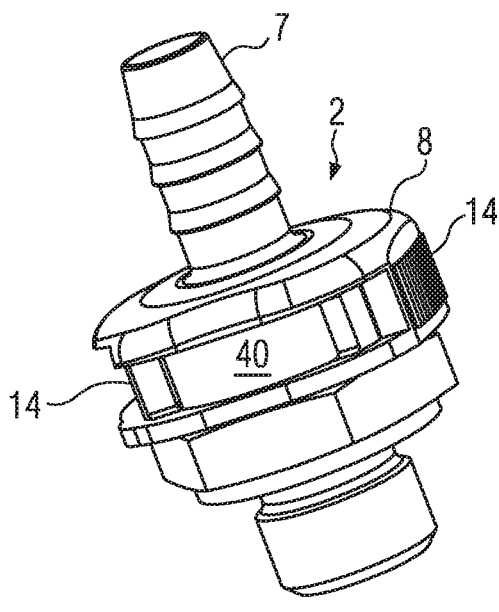
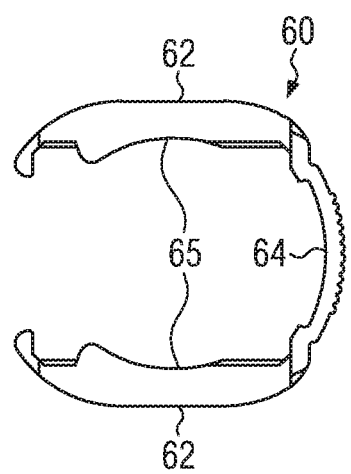
FIG. 7  FIG. 8

QUICK CONNECTOR COUPLING

The subject application claims priority to and all the benefits of European Patent Application No. 17156699.5, filed on Feb. 17, 2017, the contents of which are incorporated herein by reference in their entirety.

BACKGROUND OF THE INVENTION

The present invention relates to a quick connector coupling comprising a collar port and a connector to be coupled thereto, wherein the collar port has a cylindrical inner passage and an outwardly projecting collar around an opening of the inner passage, and wherein the connector comprises a complementary cylindrical tube portion to be received in the inner passage of the collar port, an abutment surface formed by a flange on the tube portion for abutment on the collar of the collar port when the connector is in a mounted state with the tube portion received in the inner passage, and a sealing ring received in a groove on the outer circumference of the tube portion for sealing the tube portion in the inner passage of the collar port, the quick connector coupling further comprising a locking clip for engaging the collar and an engagement surface of the connector to lock the connector against axial movement on the collar port.

Such quick connector couplings are used in fluid line arrangements, for example in motor vehicles. The quick connector coupling includes a connector (male member) which is to be connected to a port (female part) which may for example project from a component in a vehicle. Often the connector is, on its end opposite to the end connected to the port, to be connected to a hose to establish a fluid line through the port, the connector and through the hose. The present invention is directed to connector couplings involving a standard collar port having a circular port opening and an adjoining cylindrical inner passage of a predetermined diameter. A collar is radially outwardly projecting at the end of a port wall and is circumferentially surrounding the port opening. Since such standard collar ports have a purely cylindrical inner passage no groove can be provided in the inner wall of the passage which could receive a sealing ring. Therefore, the sealing has to be provided on the tube portion of the connector which is to be received in the inner passage to establish a sealed connection of the connector and the collar port.

An example of such quick connector coupling is disclosed in DE 10 2014 102 662 A1 on which the preamble of claim 1 is based. A schematically representation of such quick connector coupling is shown in FIG. 18, partially in cross-section. The collar port 40 has a cylindrical inner passage 42, wherein a collar 44 is radially projecting in outward direction and is circumferentially surrounding the port opening of the inner passage. The connector 2 comprises a cylindrical tube portion 4 which is the male member to be received in the complementary inner passage of the collar port. At a distance to the projecting end of the tube portion a flange 8 is formed on the connector, which flange is projecting outwardly and is circumferentially surrounding the connector. The lower surface of the flange 8 facing the collar forms an abutment surface for abutment on an upper surface of the collar 44 when the connector is in a mounted state with the tube portion 4 received in the inner passage 42 of the collar port. The tube portion 4 is provided with a circumferentially extending groove 12 in which an O-ring 10 is received for sealing the tube portion 4 in the inner passage 42 of the collar port. For fixing the connector on the collar port a locking clip 60 is provided. The locking clip has two flexible arms which surround essentially the entire circumference of the collar and of the flange of the connector. As can be seen in FIG. 18 the locking clip has also in the cross-section the shape of a bracket with two connected opposite arms, one of them engaging the collar 44 from below and the other engaging a groove in the flange 8 to thereby lock the connector on the collar port against axial movements.

A disadvantage of this known quick connector coupling is that it requires a substantial build height in axial direction of the inner passage and of the tube portion of the connector. With reference to FIG. 18 it is clear that the O-ring 10 of the tube portion of the connector has to be at a certain depth inside of the inner passage 42 of the collar port to provide a reliable seal. Furthermore, additional length of the connector in axial direction is needed for the connection of the collar and the flange of the connector by the mounting clip 60. It is not possible in this design to move the O-ring 10 of the connector and the flange 8 closer together in axial direction, or to dispose the O-ring 10 at the same axial level as the flange 8 of the connector because the O-ring could then no longer be inside the inner passage, and thus could no longer fulfill its sealing function.

A quick connector coupling of another type is described in U.S. Pat. No. 5,586,792 B1. This type of quick connector coupling differs from the type described before in that the collar of the port is disposed at a distance to the opening of the port, and the port forms the male member received in an inner passage of the connector which forms the female member of the coupling. The sealing is provided by O-rings received in grooves in the interior of the inner passage of the connector. The connector is further provided with a terminal housing having openings which allow to insert a locking clip which is then disposed between the collar introduced into the opening of the terminal housing of the connector and an engagement surface of the terminal housing to thereby lock the connector and the port against axial movements with respect to each other. However, as already indicated this coupling is of a different type than the type first described to which the present invention is directed. Furthermore, also this design has a large axial build height since the O-rings in the inner passage of the connector cannot be moved to the same axial level as the locking clip.

To the contrary the design requires an axial offset between the O-rings and the terminal housing for the locking clip since the inner passage of the connector is axially offset with respect to the terminal housing for receiving the locking clip.

It is an object of the present invention to provide a quick connector coupling of the type as first described above which allows for a more compact design and requires less build height in axial direction of the connector coupling.

This object is achieved by a quick connector coupling comprising the features of claim 1. Preferred embodiments of the invention are described in the dependent claims.

SUMMARY OF THE INVENTION

According to the present invention the flange is provided with two circumferentially opposite extensions extending along the tube position past and beyond the collar when the flange is in abutment on the collar. The extensions carry a terminal ring which is disposed parallel to and at a distance to the flange such that a surface of the terminal ring facing the flange forms the engagement surface of the connector at a distance to the collar when the connector is in the mounted state. The locking clip is arranged to be disposed between the engagement surface of the terminal ring and the collar to engage the engagement surface and the collar when the connector is in the mounted state. In this manner the locking clip locks the connector on the collar port against axial movement of the connector away from the collar port since it abuts simultaneously on the facing surfaces of the collar and the engagement surface of the terminal ring so that the locking clip prevents that the connector is withdrawn from the collar port, whereas the abutment surface of the flange rests on the collar so that axial movement of the connector in the opposite direction is also impossible. According to the invention the sealing ring groove is axially disposed on the tube portion such that it is closer to the flange than the engagement surface when the connector in its mounted state.

According to the present invention it is possible that the O-ring of the tube portion of the connector is axially disposed at the same level as the locking clip. Therefore, the build height in axial direction may be reduced compared to the prior art discussed above which required an offset in axial direction between the O-ring of the tube portion and the flange on the tube portion on the connector.

In many applications the connector of the quick connector coupling is formed of plastics by injection molding. In order to be able to conceive the concept of the present invention and to even think of placing the sealing ring groove in the axial region between the flange and the engagement ring of the connector the inventors had to overcome the following difficulty. When considering the injection molding tools needed the person skilled in the art is aware that, besides two opposite molding tool parts, at least one removable core tool is needed to form the tube portion of the connector. The skilled person would also realize that for the sealing ring groove additional removable core tools would be needed, and it would appear inevitable that these addition core tools in the area below the flange of the connector would interfere with the core tool for the tube portion of the connector and would prevent that the core tool for the tube portion is removed in its axial direction from the mold. However, it has surprisingly been found by the inventors that there is a way to add two opposite slide tools which carry tool portions for forming the sealing ring groove and which extend into the core tool for the tube portion of the connector, without making the removal of the core tool impossible. The arrangement of these two additional sliding tools will be described further below with reference to the drawings. In any case, the supposed complexity of the molding tool design for a sealing ring groove in the axial region at issue would have discouraged skilled persons to further pursue an idea and design concept of placing the sealing ring groove at the same axial level as the locking clip to finally arrive at the design of the present invention.

According to a preferred embodiment the sealing ring groove is disposed on an axial level of the tube portion of the connector such that it is between the flange and the engagement surface of the terminal ring of the connector.

In a preferred embodiment the extensions of the flange have a small dimension in circumferential direction of the flange such that the clear distance between the side edges of two opposite extensions is smaller than the diameter of the tube portion of the connector. This allows to advance two opposite sliding tools which carry tool portions for the seating ring groove into the core tool, wherein the window between the opposite extensions is formed by the inserted opposite sliding tools.

In a further preferred embodiment one or more further sealing ring grooves are provided on the tube portion at larger axial distances to the flange than the sealing ring groove at the axial level of the locking clip. Multiple sealing rings of different materials/hardness are useful to provide reliable sealing over an extended temperature range.

In a preferred embodiment the connector and the collar port are provided with complementary surface structures which engage each other when the connector is in the mounted state on the collar port and which ensure a unique rotational orientation of the connector with respect to the collar port.

In a further preferred embodiment the tube portion of the connector merges into a hose connector tube portion extending beyond the flange of the connector, which hose connector tube portion is adapted to be inserted into an end portion of a hose that is to be connected thereto.

In a preferred embodiment the locking clip is formed as a flexible bracket with two opposite, bent arm portions connected by an apex portion such that the locking clip is insertable by advancing the apex portion towards one of the extensions of the connector with one bent arm portion advancing on one side of the extension and the other bent arm portion is advancing on the other side of the extension, wherein the bent arm portions are dimensioned such that they extend around the tube portion to the opposite extension of the connector, and are arranged to come into abutment with the inner surface of the collar and with the engagement surface of the terminal ring when the connector is pushed onto the collar port to bring the connector to the mounted state on the collar port.

DESCRIPTION OF THE DRAWINGS

The invention will now be described with reference to a preferred embodiment shown in the drawings in which:

FIG. 3 is a perspective exploded view of the quick connector coupling of FIGS. 1 and 2;

FIG. 4 is a perspective exploded view of the quick connector coupling of FIGS. 1 to 3, wherein the quick connector is rotated by 90° compared to FIG. 3;

FIG. 5 is a side view of the quick connector coupling, with the connector in its mounted state on the collar port and without locking clip;

FIG. 6 is a cross-sectional view taken along the line indicated by the arrows in FIG. 5, wherein the plane of the cross-section cuts through the opposite extensions of the flange;

FIG. 7 is a perspective view of the quick connector coupling of FIGS. 5 and 6 in the mounted state;

FIG. 8 is a view of the locking clip from above;

DETAILED DESCRIPTION

Figure 1:
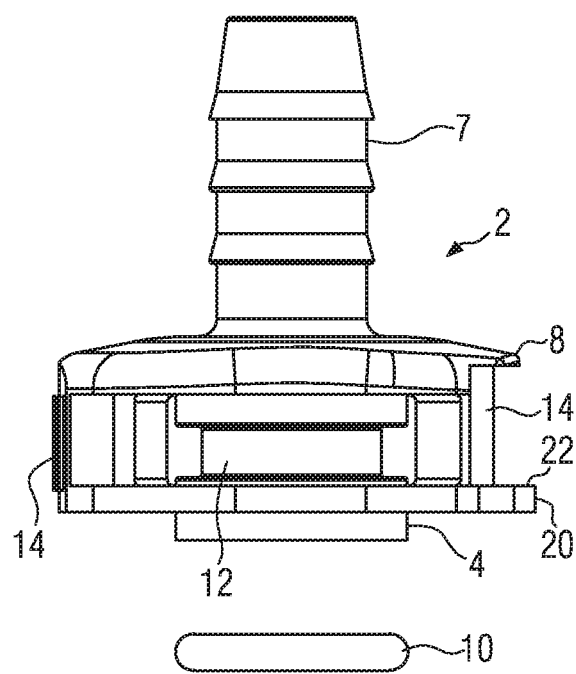
FIG. 1 shows an exploded side view of the quick connector coupling.
Figure 2:
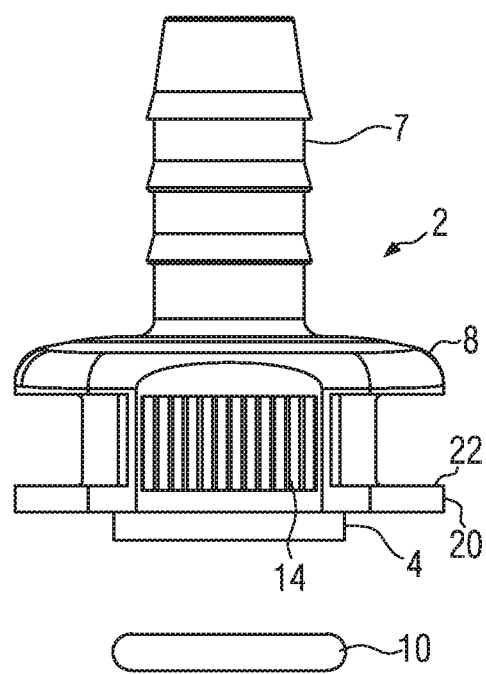
FIG. 2 shows an exploded side view of the quick connector coupling of FIG. 1, wherein the quick connector coupling is rotated by 90° around the longitudinal axis of the quick connector coupling compared to FIG. 1.

The embodiment of the quick connector coupling shown in the Figures will now be described by first describing the main components of the quick connector coupling with reference to FIGS. 1 to 8.

The first component is collar port 40 which may be coupled to a further device which is not part of the quick connector coupling. The collar port 40 has a through-going inner passage which in the upper end portion of the port collar 40 is a purely cylindrical inner passage 42 (see FIGS. 3 and 4) which is dimensioned to receive a tube portion 4 of a connector 2 which will be described below. The end of the tubular portion of the collar part 40 which is to be connected to the connector 2 is provided with an outwardly projecting, circumferentially extending collar 44. This collar 44 is intended to come with its planar upper surface into abutment with a counter-surface of the connector 2 as will be described below. The opposite surface of collar 44 is referred to as lower or inner surface of the collar herein.

The second main component of the quick connector coupling is connector 2 which comprises a cylindrical tube portion 4 which has a complementary shape to the inner passage 42 of the collar port 40 and which is received in this inner passage 42 when the connector 2 is in a mounted state on the collar port 40. A flange 8 is formed on the connector 2, which flange 8 radially extends from an upper end of the tube portion 4 of the connector. On an inner surface of the flange 8 an abutment surface 6 (see FIG. 6) is formed. This abutment surface 6 of the flange 4 rests on the upper surface of collar 44 (see FIG. 6) when connector 2 is in the mounted state on the collar port 40.

Tube portion 4 merges into a hose connector tube portion 7 extending on the opposite side of flange 8. This hose connector tube portion 7 is provided with wedge-shaped circumferential projections for assisting in fixation of a hose to the connector.

Figures 9, 10:
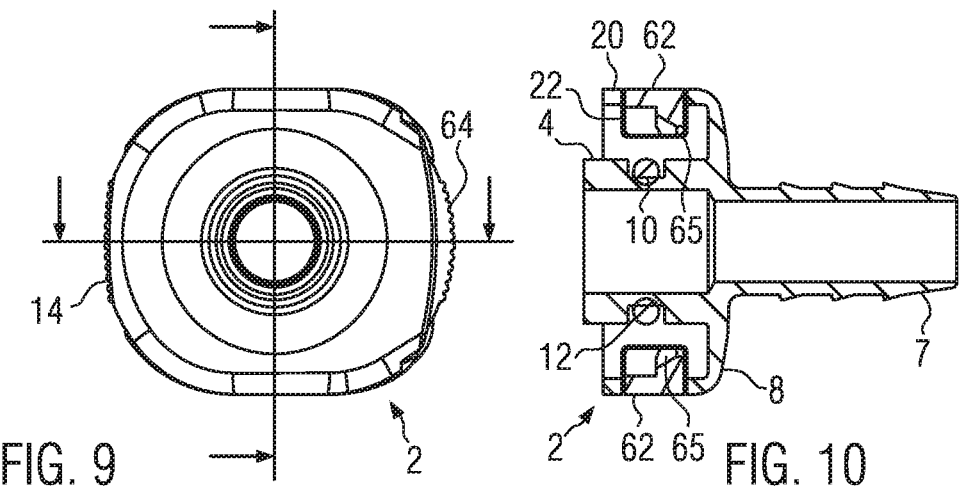
FIG. 9 is a top view of the connector of the coupling from above, wherein the locking clip is mounted to the connector.
FIG. 10 is a cross-sectional view taken along the vertical line indicated by arrows in FIG. 9.
Figure 11:
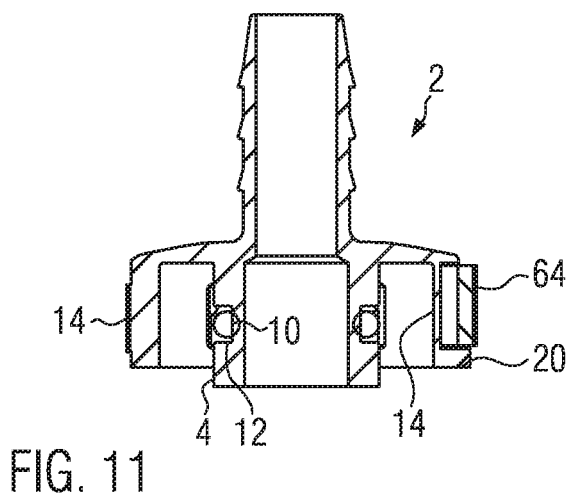
FIG. 11 is a cross-sectional view taken along the horizontal line indicated by arrows in FIG. 9.
Figure 12:
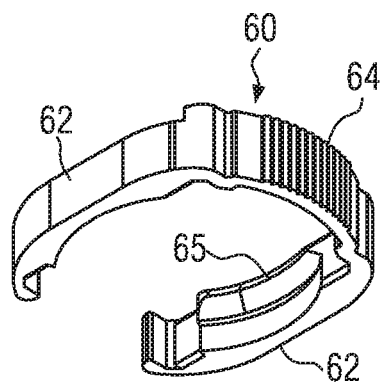
FIG. 12 is a perspective view of the locking clip.

Flange 8 is provided with two opposite extensions 14 which are disposed circumferentially opposite to each other and which extend at a distance to and parallel to the longitudinal axis of tube portion 4. Extensions 14 carry a terminal ring 20 at a distance to flange 8 in axial direction. This terminal ring 20 is not circular, as can be seen from FIG. 9 which shows a top view of the connector from above which shows that the lower portion of of the connector is not circular. On its upper surface which faces flange 8 the terminal ring 20 presents an engagement surface 22 which can for example be seen in FIGS. 1 to 4. In this embodiment the engagement surface 22 is not extending around the entire circumference, as can be seen in the cross-sectional view of FIG. 6 which shows that in the area of the extension 14 on the right hand side there is no engagement surface, whereas the engagement surface 22 is present in the circumferential region of the terminal ring 20 between the opposite extensions 14, and in the region of the extension on the left hand side in FIG. 6. In the region of extension 14 on the left hand side of FIG. 6 the engagement surface 22 is projecting radially outwardly from this extension 14. In this region an apex portion 64 of a locking clip 60 is received when the locking clip is inserted as is shown in FIG. 11.

In the tube portion 4 of connector 2 a circumferential groove is formed, as can be seen for example in FIG. 1. This groove 12 is disposed, in axial direction of tube portion 4, between flange 8 and terminal ring 20 of the connector. Groove 12 is formed in the outer surface of tube portion 4 for receiving a sealing ring 10 which may be an O-ring. As can be seen in FIG. 6 the sealing ring 10 is disposed at an axial level of tube portion 4 between the engagement surface 22 of terminal ring 20 and the lower surface of collar 44 which surfaces serve to lock the connector 2 on the collar port 40 by means of locking clip 60 (not shown in FIG. 6). This means that the sealing ring 10 and the locking structures which serve to lock connector 2 on the collar port 40 are disposed at the same axial level, and therefore the design of the quick connector coupling of the present invention is extremely compact and requires less build height in axial direction in comparison to the prior art.

In the following the function of locking clip 60 and the cooperating locking surfaces of the collar 44 and the connector 2 will be described. The locking clip 60 which is shown in FIGS. 1 to 4, 8, and 12 is formed of flexible material and comprises an apex portion 64 and two opposite bent arm portions 62. As can be seen from the perspective view of FIG. 12 the bent arm portions 62 have at their upper edge radially inwardly directed projections 65. These inward projections of the bent arm portions 62 are also visible in the cross-sectional view of FIG. 10 which shows the locking clip 60 in an inserted state on the connector 2, but without collar port. As can also be seen from FIG. 10, the lower surface of bent arm portions 62 opposite to the inward projection 65 are in abutment on the engagement surface 22 of the terminal ring 20. FIG. 11 shows that the locking clip 60 also rests with its apex portion 64 on the engagement surface 22 of the outwardly projecting part of terminal ring 20 in the area of extension 14 on the right hand side of FIG. 11.

Before the connector 2 is brought to its mounted state on the collar port 40, as shown in FIGS. 5 and 6 (please note that in FIG. 5 and the locking clip 60, which is present in the mounted state, has been omitted for illustrational purposes), the locking clip 60 is first inserted by advancing its bent arm portions 62 into the free space between flange 8 and engagement surface 22 of terminal ring 20 on the left and on the right hand side of tube portion 4. When locking clip 60 is fully advanced its bent arm portions 62 embrace the tube portion 4 of the connector and the inner surface of apex portion 64 comes into abutment on the engagement surface but a gap remains between the apex portion 64 and the outer surface of the extension 14 shown on the right hand side of FIG. 11. In the inserted state the forward ends of the bent arm portions 62 engage the extension 14 opposite to the apex portion 64 to hold the locking clip 60 on the connector 2.

To bring the connector 2 to the mounted state on the collar port 40 the connector 2 is, with the locking clip 60 in place on the connector 2, pushed onto collar port 40 such that the tube portion 4 is received in the inner passage 42 of the collar port. In the course of this movement the collar 44 contacts the projections 65 of the locking clip 60 and spreads the bent arm portions 62 apart. When the collar has passed the bent arm portions 62 they elastically flex back and come into abutment on the lower or inner surface of the collar 44. In this state locking clip 60 rests with lower surface portions thereof on engagement surface 22 of terminal ring 20, whereas the inward projections 65 of the bent arm portions 62 engage the inner or lower surface of collar 44 of collar port 40. In this manner connector 2 is locked on collar port 40 since locking clip 60 extends with its bent arm portions between the engagement surface 22 of terminal ring 20 of connector 2 and the inner surface of collar 44, thus preventing any movement of connector 2 in axial direction away from collar port 40. Since connector 2 is furthermore with its abutment surface 6 (see FIG. 6) in abutment on the outer surface of collar 44 axial movement of the connector 2 in direction further towards the collar port 40 is also impossible so that connector 2 is completely locked on collar port 40.

If it is intended to remove connector 2 from the collar port 40 a pushing force is exerted on the apex portion 64 of the locking clip 60 so that it is moved towards the extension 14 14 on the right hand side in FIG. 6. In this manner the bent arm portions 62 are spread apart so that the collar 44 can pass by when the connector 2 is withdrawn from the collar port 40.

Figure 13:
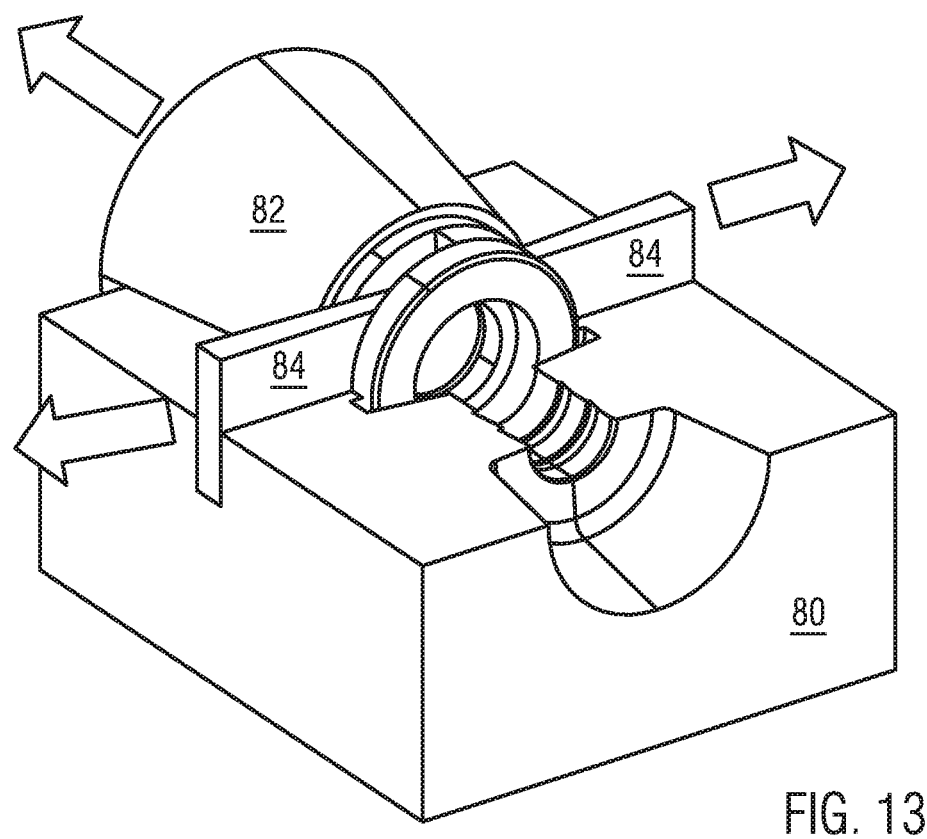
FIGS. 13 and 14 are perspective views of the lower molding tool and additional core tools used for making the connector of the previous Figures by injection molding.
Figure 14:
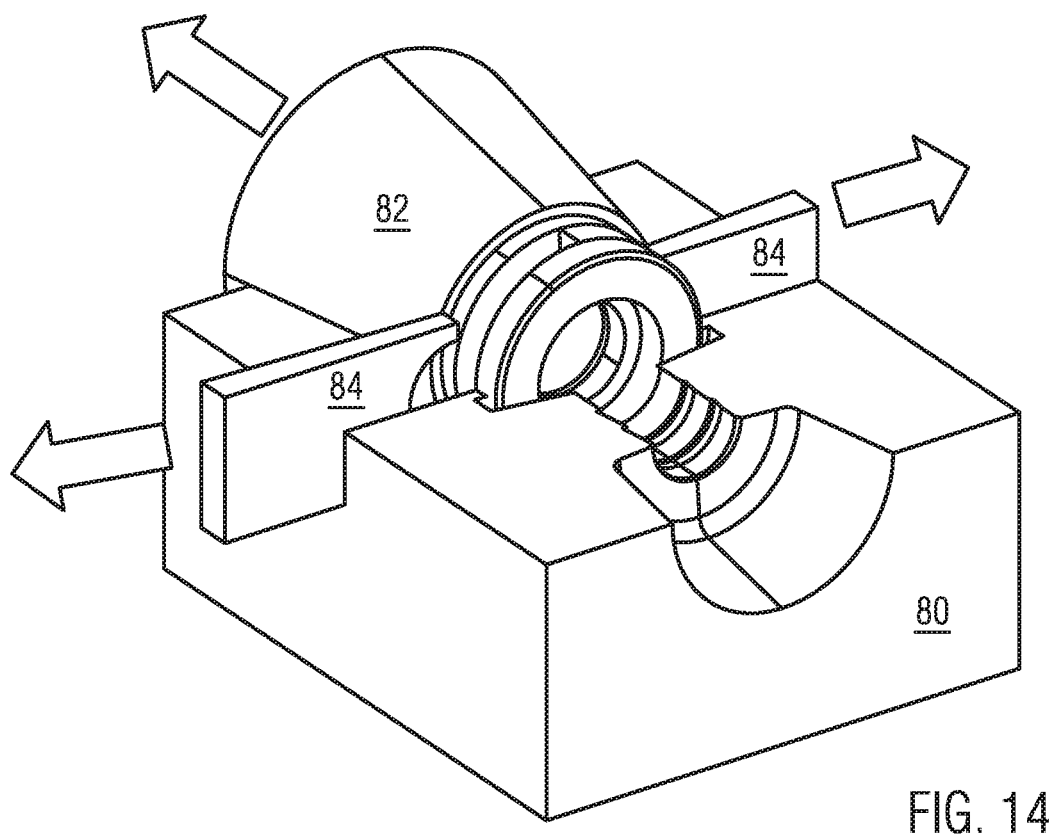
Figure 15:
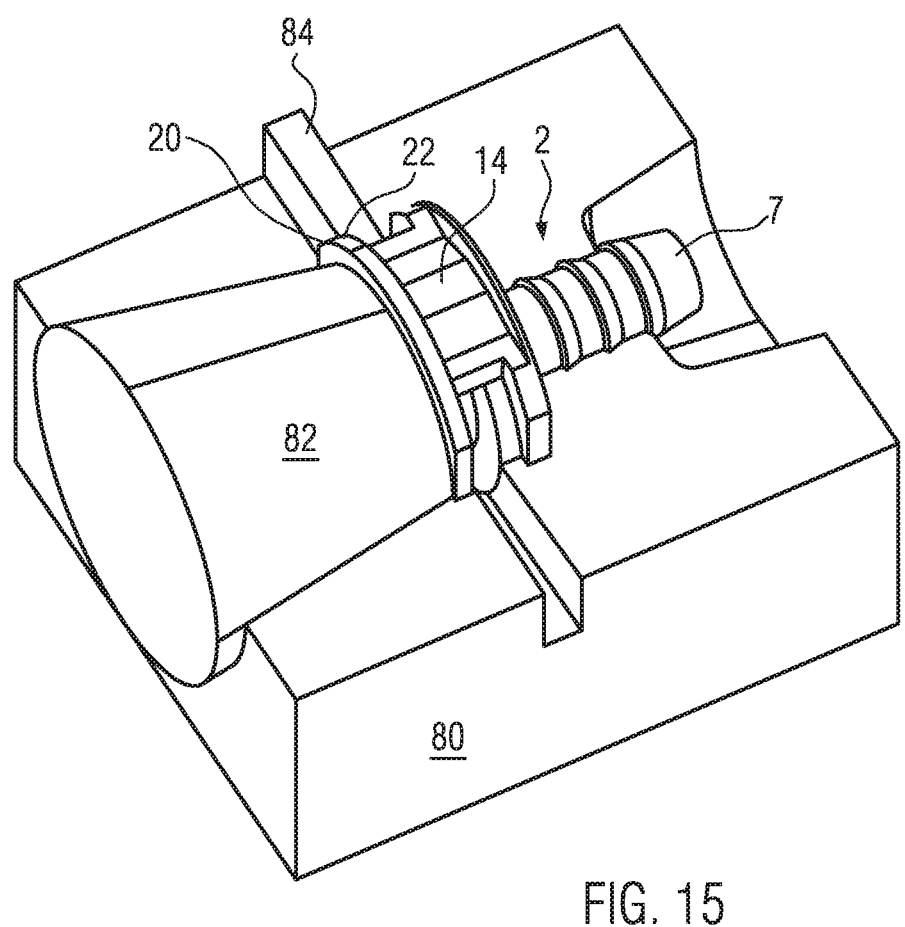
FIG. 15 is a perspective view of the lower part of the molding tool, with one of the sliding core tools removed for illustration and with a connector formed in this tool.

In FIGS. 13 to 15 perspective views of molding tools are shown with the upper mold removed to illustrate a possible molding tool arrangement suitable for forming the connector of the described embodiment of the quick connector coupling by injection molding.

In FIG. 15 the molded connector 2 is shown in the molding tool. The molding tools comprise besides a lower mold 80 a core mold tool 82 which is removable and which is provided for forming the tube portion 4 of connector 2. Further core tools 84 are provided for forming the open spaces between flange 8 and terminal ring 20 of connector 2 and for forming the sealing ring groove 12 in the outer wall of tube portion 4. As has been explained above injection molding of the connector with the structures of the present invention including the sealing ring groove in the area between flange 8 and terminal ring 20 would appear impossible since the additional core tools for the sealing ring groove and the connecting structures of the connector 2 would appear to interfere with the removability of core tool 82 which has to be withdrawn in its axial direction from the mold. In connection with the present invention it has been found that two opposite, sliding core tools can be provided which form the hollow areas between the terminal ring 20 and flange 8 and which form the sealing ring groove 12 in the tube portion 4. These opposite sliding core tools 84 are, when the connector 2 has been molded, withdrawn in the direction indicated by the arrows in FIGS. 13 and 14, whereafter the conical core tool 82 can be withdrawn in its axial direction.

In FIG. 15 one of the sliding core tools 84 has been omitted for illustrational purposes. In FIG. 14 the structure of the sliding core tool 84 at its inner end has been illustrated in a simplified manner indicating the semicircular portion for forming one half of the sealing ring groove 12 only but omitting for illustrational purposes the further projections needed for forming the free spaces between the flange 8 and the terminal ring 20.

Figure 16:
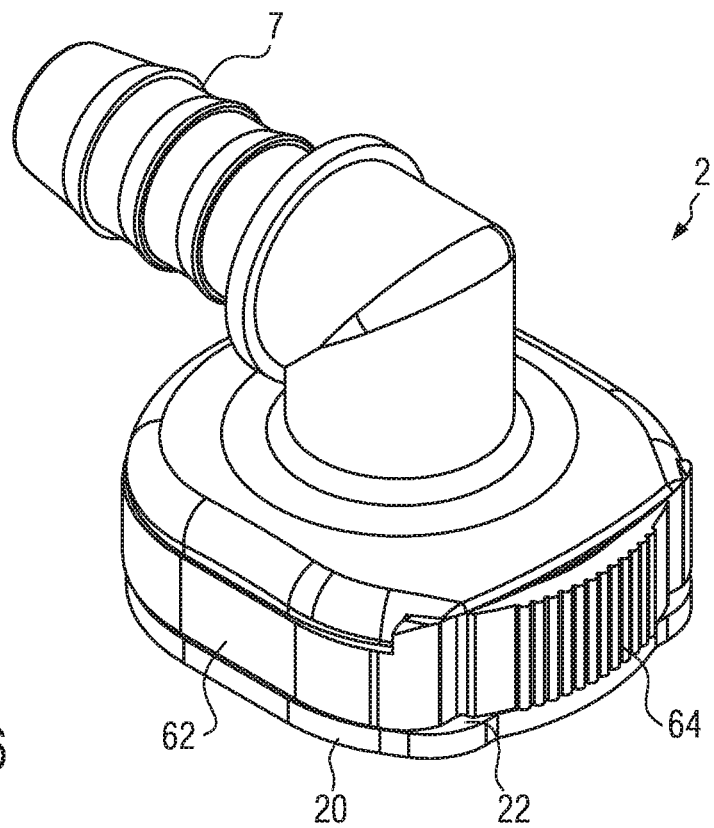
FIGS. 16 and 17 show perspective views of a connector of a second embodiment of the quick connector coupling.
Figure 17:
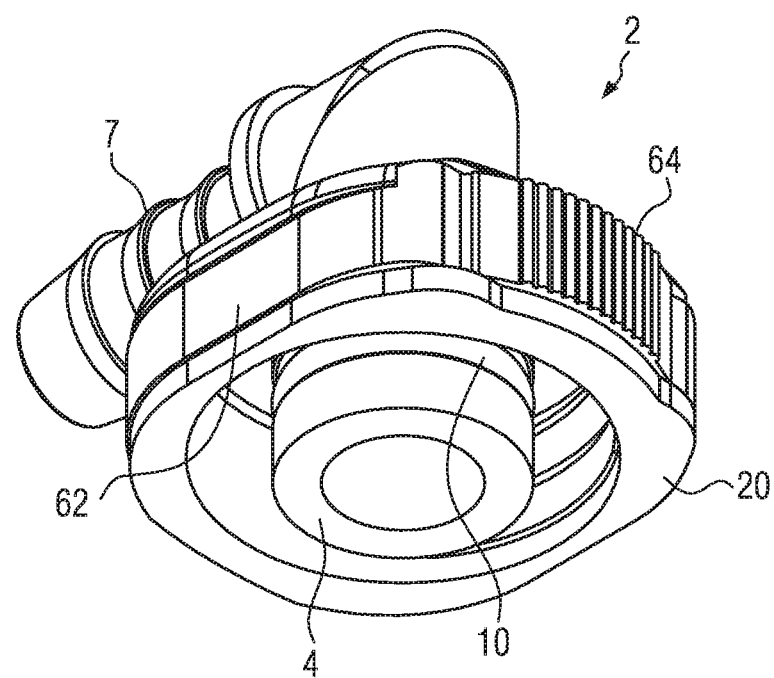
Figure 18:
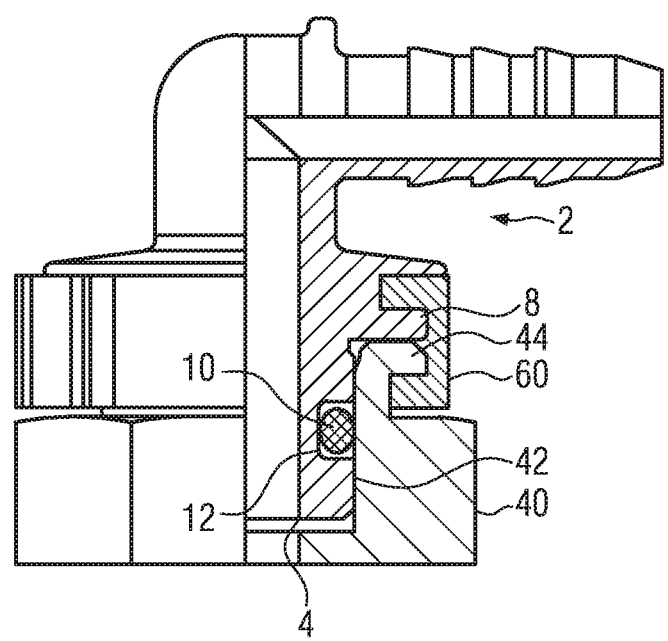
FIG. 18 shows a view of a prior art connector coupling, partially in cross-section.

FIGS. 16 and 17 show a further embodiment of connector 2 of the quick connector coupling. This connector 2 also has a tubular portion 4 with a sealing ring 10 to be received in the inner passage of a collar port. The locking clip is inserted into the connector. This embodiment differs from the above described by the orientation of the hose connector tube portion 7 which in this case is oriented perpendicularly to the axial direction of tube portion 4 of the connector. This design requires less space in axial direction of the tube 4 of the connector.

REFERENCE NUMERALS

2 Connector
4 Tube portion
6 Abutment surface
7 Hose connector tube portion
8 Flange
10 Sealing ring
12 Groove
14 Flange extensions
20 Terminal ring
22 Engagement surface
40 Collar port
42 Inner passage
44 Collar
60 Locking clip
62 Bent arm portion
64 Apex portion
80 Mold tool
82 Conical core tool
84 Sliding core tools

The invention claimed is:

1. A quick connector coupling comprising:
   a collar port having a cylindrical inner passage and an outwardly projecting collar around an opening of the inner passage;
   a connector to be coupled to the collar port and the connector comprising a cylindrical tube portion complementary to the cylindrical inner passage of the collar port with the cylindrical tube portion to be received in the cylindrical inner passage of the collar port, and said cylindrical tube portion comprising a flange with the flange forming an abutment surface for abutment on the collar of the collar port when the connector is in a mounted state with the tube portion received in the cylindrical inner passage;
   a sealing ring received in a groove on an outer circumference of the tube portion for sealing the tube portion in the inner passage of the collar port; and
   a locking clip for engaging the collar and an engagement surface of the connector to lock the connector against axial movement on the collar port,
   wherein the flange is provided with two circumferentially opposite extensions extending along the cylindrical tube portion of the connector past and beyond the collar when the connector is in the mounted state, the extensions carrying a terminal ring disposed parallel to and at a distance from the flange such that a surface of the terminal ring facing the flange forms the engagement surface of the connector at a distance to the collar when the connector is in the mounted state, and
   wherein the locking clip is arranged to be disposed between the engagement surface of the connector and the collar to engage the engagement surface and the collar when the connector is in the mounted state such that the locking clip locks the connector on the collar port against axial movement away from the collar port, and the groove is axially formed on the tube portion.

2. The quick connector coupling according to claim 1, wherein the groove is formed on an axial level of the tube portion of the connector such that the groove is between the flange and the engagement surface of the connector.

3. The quick connector coupling according to claim 2, wherein the locking clip is further arranged at the same axial level of the cylindrical tube portion as the sealing ring received in the groove.

4. The quick connector coupling according to claim 1, wherein the extensions of the flange have a small dimension in circumferential direction of the flange such that a clear distance between side edges of the two opposite extensions is larger than an outer diameter of the tube portion of the connector.

5. The quick connector coupling according to claim 1, wherein the connector has a complementary shape to the collar port and the connector and the collar port engage each other when the connector is in the mounted state which ensures a unique rotational orientation of the connector with respect to the collar port.

6. The quick connector coupling according to claim 1, wherein the tube portion of the connector merges into a hose connector tube portion extending beyond the flange of the connector, the hose connector tube portion adapted to be inserted into an end portion of a hose to be connected to the connector.

7. The quick connector coupling according to claim 6, wherein the hose connector tube portion is aligned with the cylindrical tube portion of the connector.

8. The quick connector coupling according to claim 6, wherein the hose connector tube portion is perpendicular to the cylindrical tube portion of the connector.

9. The quick connector coupling according to claim 1, wherein the locking clip is formed as a flexible bracket with two opposite bent arm portions connected by an apex portion such that the locking clip is insertable by advancing the apex portion towards one of the extensions of the connector with one bent arm portion advancing on one side of the extension and the other bent arm portion advancing on the other side of the extension, and
    wherein the bent arm portions are dimensioned such that the bent arm portions extend around the tube portion to the opposite extension of the connector, and the bent arm portions are arranged to come into abutment with a lower surface of the collar and with the engagement surface of the connector when the connector is pushed onto the collar port to bring the connector to the mounted state on the collar port.

10. The quick connector coupling according to claim 1, wherein the terminal ring has a circumference and the engagement surface extends partially around the circumference of the terminal ring.

11. The quick connector coupling according to claim 1, wherein the terminal ring has a circumferential region extending partially around the terminal ring including one of the extensions, and the engagement surface projects radially outwardly from the circumferential region of the terminal ring.

\* \* \* \* \*